United States Patent [19]
Allpress et al.

[11] Patent Number: 5,956,345
[45] Date of Patent: Sep. 21, 1999

[54] IS-95 COMPATIBLE WIDEBAND COMMUNICATION SCHEME

[75] Inventors: Stephen Alan Allpress, Randolph; Nallepilli S. Ramesh, New Providence, both of N.J.

[73] Assignee: Lucent Technologies Inc., Murray Hill, N.J.

[21] Appl. No.: 08/712,831

[22] Filed: Sep. 13, 1996

[51] Int. Cl.[6] ............................ H04B 7/216; H04B 7/208; H04J 13/00

[52] U.S. Cl. .......................... 370/480; 370/209; 370/342; 370/343; 370/479

[58] Field of Search ...................................... 370/208, 209, 370/328, 335, 342, 441, 485, 537, 204, 203, 210, 479, 480, 482, 341, 343, 344; 375/200–210; 364/727.01; 455/422, 426, 507

[56] References Cited

U.S. PATENT DOCUMENTS

| | | | |
|---|---|---|---|
| 5,319,672 | 6/1994 | Sumiya et al. | 375/200 |
| 5,414,728 | 5/1995 | Zehavi | 375/200 |
| 5,583,851 | 12/1996 | Kato et al. | 370/342 |
| 5,619,526 | 4/1997 | Kim et al. | 370/209 |
| 5,623,485 | 4/1997 | Bi | 370/209 |
| 5,729,570 | 3/1998 | Magill | 370/204 |

FOREIGN PATENT DOCUMENTS

| | | |
|---|---|---|
| 0 583 059 A1 | 2/1994 | European Pat. Off. |
| 0 729 241 A2 | 8/1996 | European Pat. Off. |
| WO 92/00639 | 1/1992 | WIPO |
| WO 93/14588 | 7/1993 | WIPO |
| WO 95/12943 | 5/1995 | WIPO |

OTHER PUBLICATIONS

"The PCS CDMA System Overview", by Ephraim Zehavi and Edward Tiedemann, Proceedings of 1994 Third IEEE International Conference on Universal Personal Communications, in NY, Sep. 27, 1994 to Oct. 1, 1994, pp. 83–88.

"Principles of communications systems", by H. Taub and and D.L. Schilling, 1986 McGraw–Hill, NY, pp. 261–262.

*Primary Examiner*—Chi H. Pham
*Assistant Examiner*—Ricky Q. Ngo

[57] ABSTRACT

A plurality of modulated signals are generated for a data stream. Each modulated signal, which contains all of the information in the data stream, is generated at a different carrier frequency. The modulated signals are combined for transmission as a multi-band signal. In one embodiment, the modulated signals are compatible with signals generated in accordance with the IS-95 telecommunications standard. According to this embodiment, wideband data streams are combined with code sequences that are based on the same Walsh code sequences used to generate IS-95 signals. Each wideband data stream is encoded using either a particular Walsh code sequence or its logical negation to generate one coded stream for each carrier frequency used to generate the IS-95 signals. Each coded stream is then modulated at one of the carrier frequencies using spread-spectrum modulation to generate one of a plurality of modulated signals for that wideband data stream, where each modulated signals contains all of the information in the original wideband data stream. Through systematic assignment of Walsh code sequences and their logical negations, and through appropriate spread-spectrum modulation of the wideband data, the resulting multi-band modulated signal for each wideband data stream is assured of being orthogonal to all other such multi-band modulated signals, as well as orthogonal to every IS-95 signal. As such, the invention increases both the user and data-rate capacities of an IS-95 network without requiring any additional carrier frequencies or code sequences beyond those already supported by the IS-95 network.

30 Claims, 8 Drawing Sheets

IS-95 COMPATIBLE WIDEBAND COMMUNICATION SCHEME

BACKGROUND OF THE INVENTION

1. Field of the Invention

The present invention relates to communications, and, in particular, to cellular communications systems.

2. Description of the Related Art

The IS-95 standard, an interim standard published by the Telecommunications Industry Association, is an existing cellular communications standard that is based on code division multiple access (CDMA) methodology. In CDMA methodology, different channels are distinguished by different codes, where the signals for each channel are spread over the entire available frequency band. This differs from traditional analog schemes in which each channel is designated a unique portion of the available frequency band.

Referring now to FIG. 1, there is shown a block diagram of the forward link of a cellular network 100 conforming to the IS-95 standard. The forward link in a communications network is the communication path from the base station to a user (e.g., a cellular telephone). The reverse link, on the other hand, is the communication path from the user back to the base station. Network 100 comprises M IS-95 signal generators 102 (where M is an integer greater than 0), combiner 104, and radio frequency (RF) circuitry 106 including antenna 108. Each signal generator 102 receives narrowband data streams for up to 64 different users and processes that narrowband data to generate a communications signal conforming to the IS-95 standard. Each signal generator 102 in network 100 generates an IS-95 signal at a different carrier frequency.

According to the IS-95 standard, the narrowband data stream for each user is multiplied by a particular code sequence and then modulated at a particular carrier frequency. For a given signal generator, the narrowband data stream for each user is encoded with a different code sequence, but modulated at the same carrier frequency. The effect of modulating the narrowband data for multiple users at the same carrier frequency is to spread all of the narrowband data for each user over the entire carrier-frequency band. In order to ensure that the modulated signals for different users do not interfere with one another, the code sequences are selected to ensure that the modulated signal for each user is orthogonal to the modulated signals for all other users in the same carrier-frequency band.

The signals from the different signal generators are combined by combiner 104. The combined signal is processed by RF circuitry 106 for transmission by antenna 108 to any number of remote cellular units (e.g., mobile telephones) (not shown).

Referring now to FIG. 2, there is shown a block diagram of a portion of each signal generator 102 of cellular network 100 of FIG. 1. Under the IS-95 standard, each signal generator 102 is capable of supporting narrowband data streams from up to 64 different users usinig a single carrier frequency. Each user is assigned a different one of 64 orthogonal IS-95 forward-link Walsh codes, also known as Walsh functions or Walsh sequences. FIG. 2 shows the processing performed on the data stream for one of the users supported by signal generator 102. That is, the block diagram shown in FIG. 2 would be repeated within signal generator 102 for each user with its own narrowband data.

In particular, for a particular user, convolutional encoder 202 provides a degree of error protection by applying convolutional encoding to the user's narrowband data to generate encoded signals. Block interleaver 204 applies block interleaving to the encoded signals to generate interleaved signals. Those skilled in the art will understand that block interleaver 204 provides further error protection by scrambling data in time. In a parallel path, long pseudo-noise (PN) code generator 206 generates code signals that are then decimated by decimator 208. PN code generator 206 and decimator 208 perform encryption to provide a degree of security to the communications process. The interleaved signals from bloc interleaver 204 are combined with the decimated code signals from decimator 208 by multiplier 210.

The resulting signals from multiplier 210 are combined with one of the 64 different Walsh sequences $W_N$ by Walsh-code multiplier 212. Those skilled in the art will understand that multiplying signals by a unique Walsh sequence $W_N$ makes the resulting signals orthogonal to (and therefore non-interfering with) the signals for all of the other users of signal generator 102, each of which is multiplied by a different Walsh sequence.

The signals generated by Walsh-code multiplier 212 are then processed along two parallel paths. In the first path, multiplier 214 combines the signals from Walsh-code multiplier 212 with the signal $P_I(t)$ and the signals from multiplier 214 are then combined by multiplier 216 with the signals ($\cos w_{cm}t$), where $w_{cm}$ is the carrier frequency for the $m^{th}$ signal generator 102 of network 100. In the second path, multiplier 218 combines the signals from Walsh-code multiplier 212 with the signal $P_Q(t)$ and the signals from multiplier 218 are then combined by multiplier 220 with the signals ($\sin w_{cm}t$). $P_I(t)$ and $P_Q(t)$ are the in-phase part and the quadri-phase part, respectively, of short PN codes used in quadrature-phase shift-keying (QPSK) spread-spectrum modulation. As such, multipliers 214 and 218 further whiten the output to ensure that the signals are spread over the full carrier-frequency band. Multipliers 216 and 220 modulate the signals by the carrier frequency $w_{cm}$.

The signals from multipliers 216 and 220 are then combined at summation node 222 to generate one of up to 64 different output signals transmitted from each IS-95 signal generator 102 to combiner 104 of FIG. 1. Those skilled in the art will understand that multipliers 214–220 and summation node 222 combine to operate as a signal modulator/spreader.

Networks conforming to the IS-95 standard are limited to 64 users for each carrier frequency. Moreover, each user is limited to relatively low data-rate communications such as telephone-based voice signals. Under the IS-95 standard, each data stream is limited to a maximum of 9600 bits per second (bps). Thus, while IS-95 networks are sufficient for typical use by multiple mobile telephone users, they are nevertheless unable to support high data-rate applications. What is needed therefore is a cellular communications system that supports data-rate applications higher than those supported by conventional IS-95 networks. Since the equipment for such communications networks is extremely expensive and since an IS-95 infrastructure already exists, it is also desirable to provide a solution that is backwards compatible with IS-95 technology and the existing IS-95 infrastructure.

Further objects and advantages of this invention will become apparent from the detailed description which follows.

SUMMARY OF THE INVENTION

The present invention is directed to methods and apparatuses for generating communications signals. According to one embodiment, a plurality of modulated signals are generated for a data stream, wherein each modulated signal is generated at a different one of a plurality of carrier frequencies and each modulated signal comprises all information in the data stream. The modulated signals are combined for transmission as a multi-band signal.

According to another embodiment, the apparatus comprises a plurality of modulators adapted to generate a plurality of modulated signals for a data stream, wherein each modulator is adapted to generate a modulated signal of the plurality of modulated signals at a different one of a plurality of carrier frequencies and each modulated signal comprises all information in the data stream, wherein a combiner is adapted to combine the modulated signals for transmission as a multi-band signal.

BRIEF DESCRIPTION OF THE DRAWINGS

Other objects, features, and advantages of the present invention will become more fully apparent from the following detailed description, the appended claims, and the accompanying drawings in which:

DETAILED DESCRIPTION

The present invention is directed to a wideband communications system that provides higher data rates and supports more users than conventional IS-95 communications systems, yet is backwards compatible with existing IS-95 technology and can operate in conjunction with the existing IS-95 infrastructure.

Figure 3:
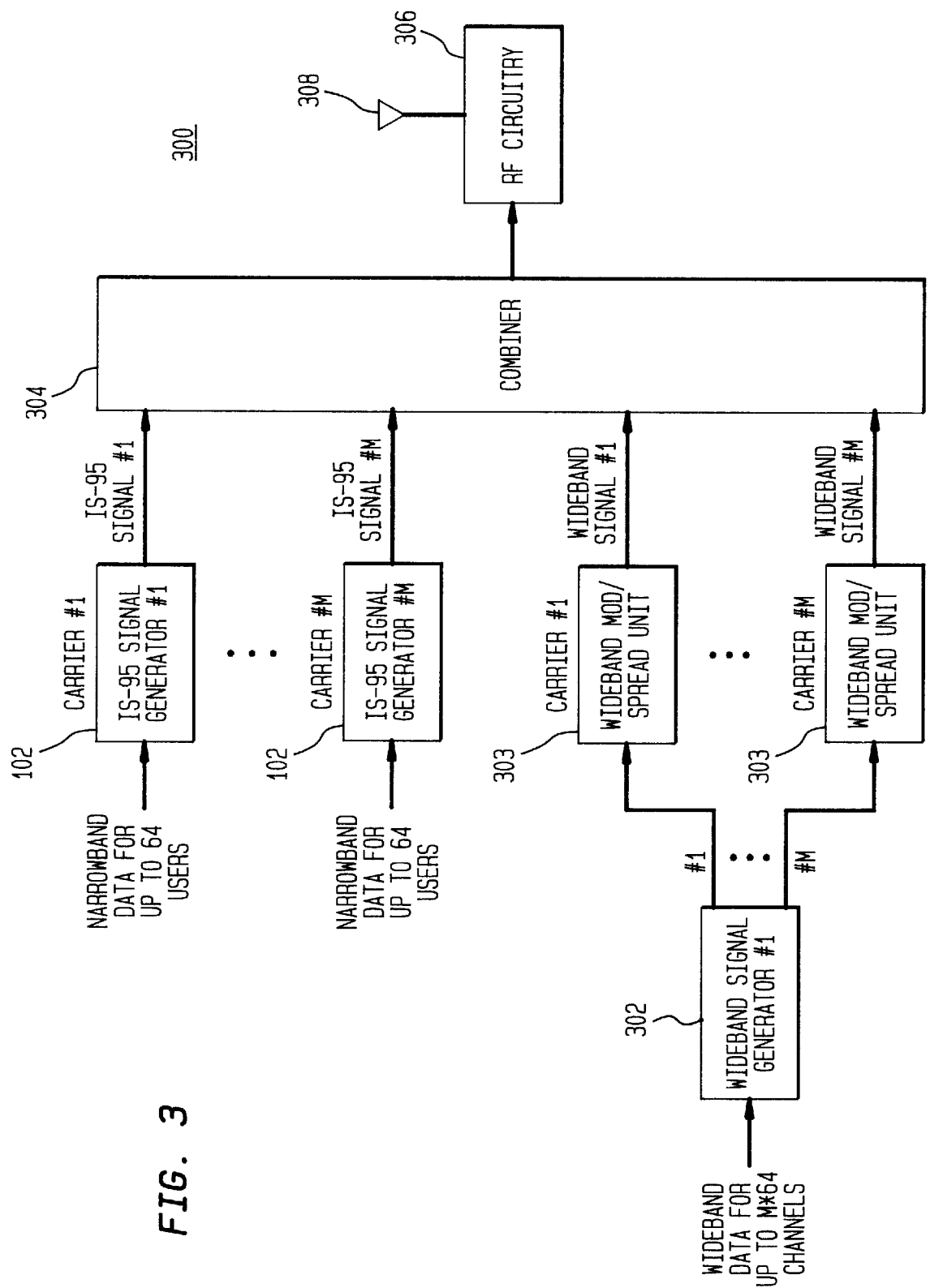
FIG. 3 is a block diagram of the forward link of a communications network according to one embodiment of the present invention.

Referring now to FIG. 3, there is shown a block diagram of the forward link of a communications network 300, according to one embodiment of the present invention. Network 300 comprises M conventional IS-95 signal generators 102 (one for each of M different carrier frequencies), wideband signal generator 302, and M wideband modulation/spreading units 303. Network 300 also comprises combiner 304 and radio frequency circuitry 306 including antenna 308. Signal generators 102, combiner 304, and RF circuitry 306 operate analogously to—and may in fact be identical to—the corresponding blocks of conventional IS-95 communications network 100 of FIG. 1.

Figure 1:
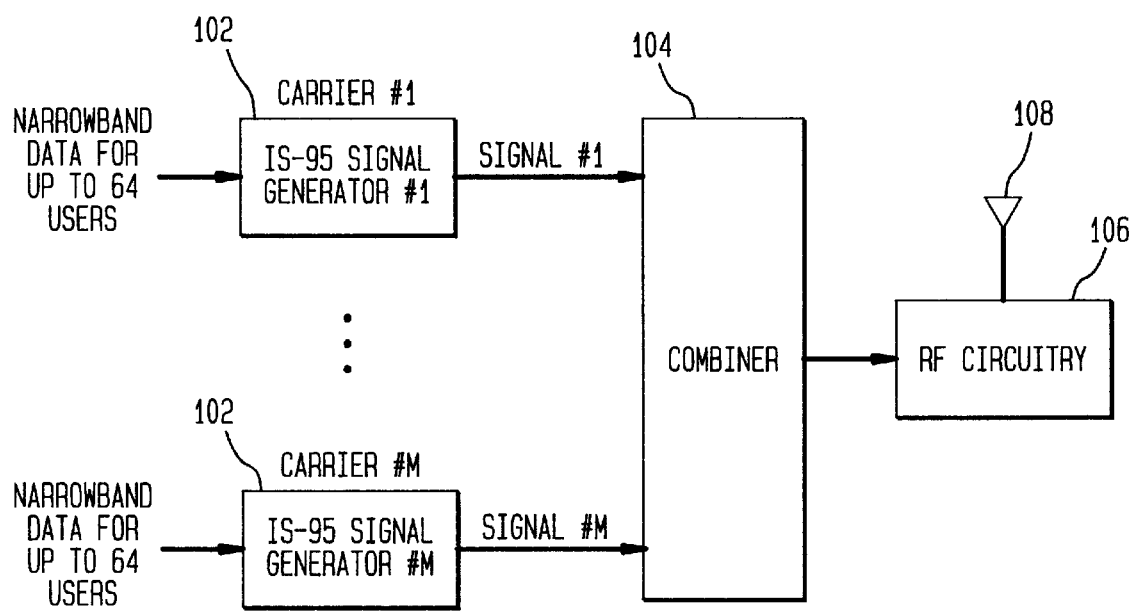
FIG. 1 is a block diagram of the forward link of a cellular network conforming to the IS-95 standard.

As in IS-95 network 100 of FIG. 1, wideband network 300 provides up to M different signal generators 102 operating at one of M different carrier frequencies, where each IS-95 signal generator 102 is capable of simultaneously processing narrowband data streams for up to 64 different users. Each IS-95 signal generator 102 modulates and spreads the narrowband data for its users over its particular carrier frequency.

Unlike IS-95 network 100, however, wideband signal generator 302 and the M wideband units 303 provide wideband network 300 with the ability to process wideband data streams for up to M*64 additional basic rate channels, where each wideband user may be allocated one or more basic rate channels depending upon the user's need. These M*64 wideband data streams may be processed simultaneously with the processing of the narrowband data streams for the up to M*64 narrowband users. For each wideband data stream, wideband signal generator 302 generates M different coded streams, where each of the M coded streams contains all of the information in the wideband data stream. Each of the M coded streams is transmitted to a different wideband unit 303 which modulates and spreads the data over a different one of the M carrier-frequency bands. Thus, each wideband data stream is modulated and spread over all of the M different carrier frequencies, where each of the M modulated signals contains all of the information for the data stream.

The wideband signals from wideband units 303 are combined with the narrowband signals from IS-95 signal generators 102 by combiner 304. The resulting combined signal is processed by RF circuitry 306 for transmission by antenna 308 to the various remote cellular units (e.g., mobile telephones) (not shown).

Wideband Signal Generator

Figure 4:
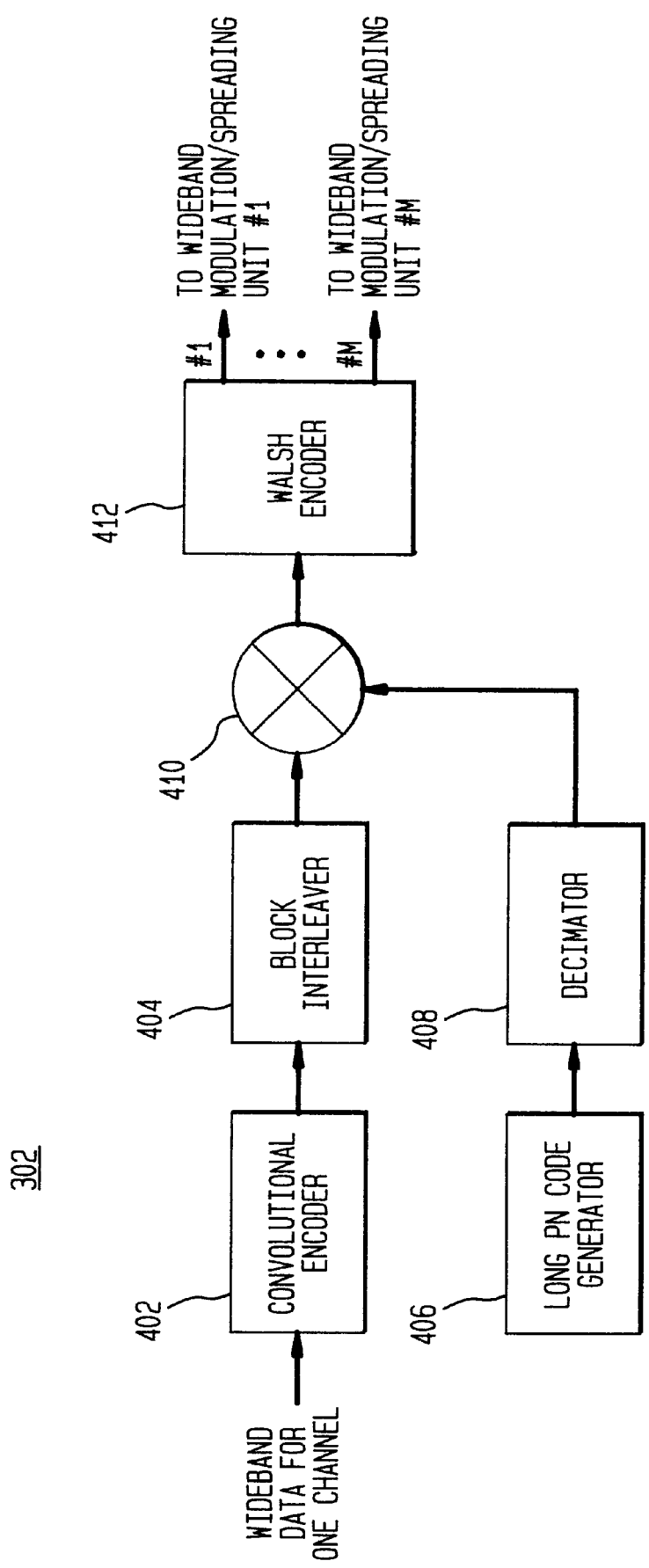
FIG. 4 is a block diagram of part of the wideband signal generator of the network of FIG. 3.

Referring now to FIG. 4, there is shown a block diagram of part of wideband signal generator 302 of network 300 of FIG. 3. FIG. 4 shows the processing performed by wideband signal generator 302 for each of up to M*64 wideband data streams. That is, the block diagram shown in FIG. 4 would be repeated within wideband signal generator 302 for each wideband data stream.

In particular, convolutional encoder 402 applies convolutional encoding to wideband signals to generate encoded signals. Block interleaver 404 applies block interleaving to the encoded signals to generate interleaved signals. In a parallel path, long PN code generator 406 generates code signals that are decimated by decimator 408. The interleaved signals from block interleaver 404 are combined with the decimated code signals from decimator 408 by multiplier 410. Blocks 402–410 of wideband signal generator 302 operate on wideband signals in a manner analogous to that by which blocks 202–210 of IS-95 signal generator 102 of FIG. 2 operate on narrowband IS-95 signals.

Figure 2:
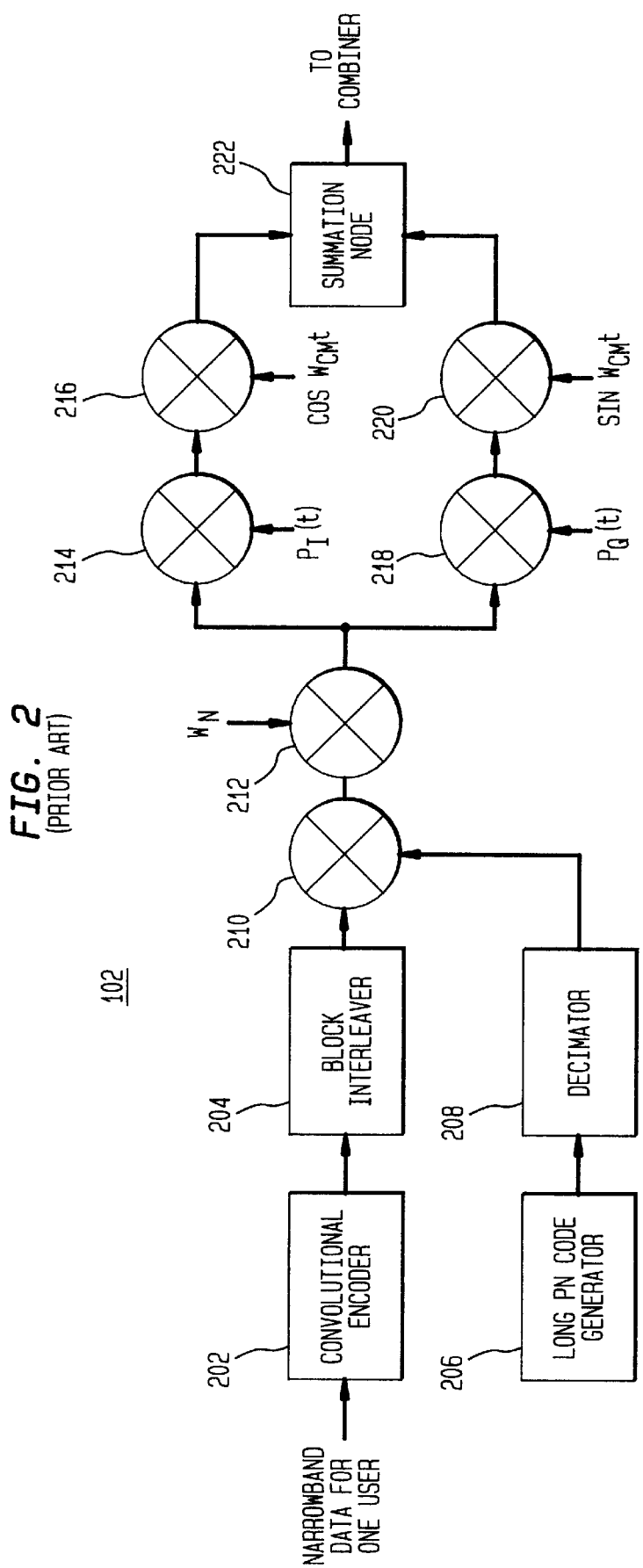
FIG. 2 is a block diagram of part of each signal generator of the IS-95 cellular network of FIG. 1.

One difference between wideband signal generator 302 of the present invention and conventional IS-95 signal generators 102 of FIG. 2 is the replacement of multiplier 212 of signal generator 102 of FIG. 1 with Walsh encoder 412 of FIG. 4. Walsh encoder 412 applies overlay Walsh encoding to the signals generated by multiplier 410 to generate M coded output streams, one for each of the wideband modulation/spreader units 303 of FIG. 3. The processing of Walsh encoder 412 is explained in further detail in the next section.

Walsh Encoder

Those skilled in the art will understand that Walsh-Hadamard matrices can be generated using the recursive relation described by Equation (1) as follows:

$$W_{2n} = \begin{bmatrix} W_n & W_n \\ W_n & \overline{W_n} \end{bmatrix} \quad (1)$$

where each element of matrix $\overline{W_n}$ is the logical negation of the corresponding element of matrix $W_n$. Those skilled in the art will understand that, in the digital realm, the logical negation of a 1 is a 0 and the logical negation of a 0 is a 1. Similarly, in the analog realm, the logical negation of $+V$ is $-V$ and the logical negation of a $-V$ is a $+V$. In the IS-95 forward link, Walsh sequences, obtained by reading out the $n^{th}$ row of a 64 by 64 Walsh-Hadamard matrix $W_{64}$, provide isolation (i.e., orthogonality) between signals. In order to maintain this isolation within a given carrier frequency and also not suffer dimensionality reduction by using the same sequence on each carrier, the following approach is used.

Assuming that there are MIS-95 carrier frequencies (where M is an integer power of 2), an M*64 by M*64 matrix is constructed from the original 64 by 64 matrix $W_{64}$ used in the forward link of an IS-95 signal generator. For example, for two carriers, M=2 and the 128 by 128 matrix $W_{128}$ is given by Equation (2) as follows:

$$W_{128} = \begin{bmatrix} W_{64} & W_{64} \\ W_{64} & \overline{W_{64}} \end{bmatrix} \quad (2)$$

Matrix $W_{128}$ can be said to have 2 macro rows and 2 macro columns and 128 micro rows and 128 micro columns, where each macro row and macro column corresponds to the entire matrix $W_{64}$ and each micro row and micro column corresponds an individual row or column of each matrix $W_{64}$. Each of the two macro columns of matrix $W_{128}$ represents the portion of the complete Walsh sequence that is allocated to one of the M=2 carriers in the system. Each micro row represents a different one of the 128 possible wideband data streams. The scheme of Equation (2) ensures that all of the 128 data streams have different and mutually orthogonal Walsh codes that are nevertheless based on the original 64 IS-95 Walsh codes.

Similarly, for four carriers, M=4 and the 256 by 256 matrix $W_{256}$ is given by Equation (3) as follows:

$$W_{256} = \begin{bmatrix} W_{64} & W_{64} & W_{64} & W_{64} \\ W_{64} & \overline{W_{64}} & W_{64} & \overline{W_{64}} \\ W_{64} & W_{64} & \overline{W_{64}} & \overline{W_{64}} \\ W_{64} & \overline{W_{64}} & \overline{W_{64}} & W_{64} \end{bmatrix} \quad (3)$$

In this case, there are 256 possible wideband data streams whose signals are spread over four carrier frequencies using different orthogonal combinations of the original 64 IS-95 Walsh codes.

Figure 5:
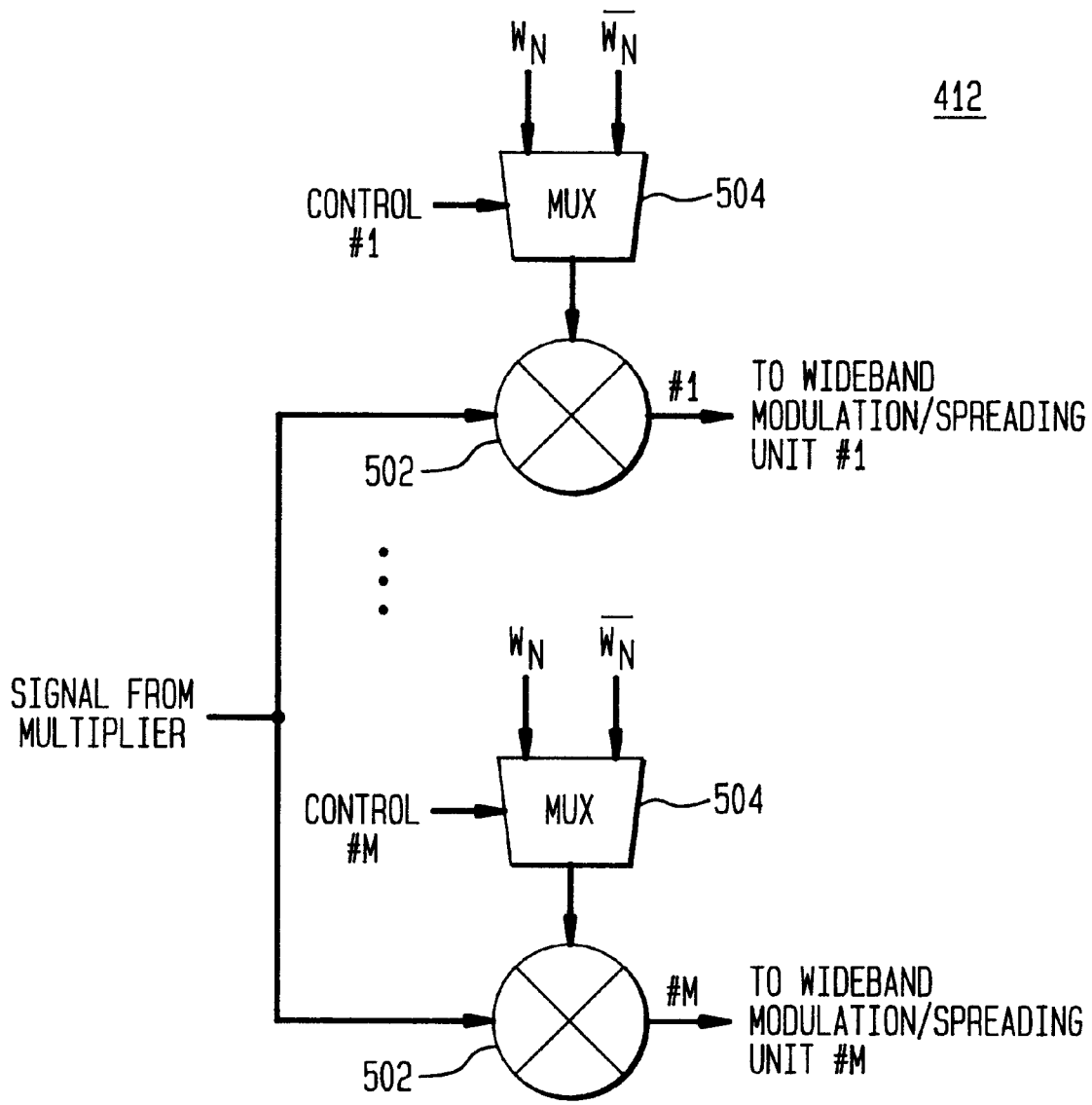
FIG. 5 is a block diagram of each Walsh encoder of the wideband signal generator of FIG. 4.

Referring now to FIG. 5, there is shown a block diagram of Walsh encoder 412 of FIG. 4, according to one embodiment of the present invention. Walsh encoder 412 has M multiplier stages, one for each carrier frequency in network 300. Walsh encoder 412 receives the signal generated by multiplier 410 of FIG. 4 and generates M coded output signals, one for each of the wideband units 303 of FIG. 3.

Each multiplier stage of Walsh encoder 412 has a multiplier 502 and a multiplexer (mux) 504. Mux 504 receives two input signals: the Walsh code sequence $W_N$ selected for the data stream and the logical negation of that Walsh code sequence. Mux 504 also receives a control signal that determines which of the two versions of the Walsh code sequence is passed to multiplier 502. Multiplier 502 combines the selected Walsh code sequence with the signal generated by multiplier 410 of FIG. 4. Each of the M signals generated by Walsh encoder 412 contains all of the information for the wideband data stream. The M signals differ (if at all) by being multiplied by either the Walsh code sequence $W_N$ or its logical negation.

Using the example of Equation (3), assume that there are four carrier frequencies. In that case, for the first data stream, the signal has the first Walsh sequence (i.e., the first row of matrix $W_{64}$) applied four different times, one for each carrier frequency. On the other hand, the signal for the 65th data stream has the first Walsh sequence applied for the first and third carrier frequencies and the logical negation of the first Walsh sequence applied for the second and fourth carrier frequencies. As such, the resulting signals are orthogonal and will not interfere. Similarly, the signals for the 129 th data stream and the 193rd data stream will use combinations of the first Walsh sequence that are orthogonal to each other and to the signals for the first and 65th data streams. Thus, the same Walsh sequence can be used to spread the wideband data for four different data streams over four different carrier frequencies.

Those skilled in the art will understand that the Walsh encoding schemes of Equations (1)–(3) can be extended to any integer power of 2 number of carriers.

In preferred embodiments of the present invention, Walsh encoder 412 is an overlay Walsh encoder. Those skilled in the art will understand that an overlay Walsh encoder assigns Walsh codes following a particular pattern. In one embodiment, each wideband data stream processed by wideband signal generator 302 of FIG. 3 may correspond to K basic rate channels, where K is an integer power of 2 (i.e., 1, 2, 4, etc.) and each basic rate channel corresponds to a data rate of up to 9600 bps. When K is greater than 1, the wideband data stream is converted into K parallel data streams, each of which is transmitted to the M multipliers 502 of FIG. 5 for transformation into M coded streams. The Walsh code sequences selected for the K parallel data streams follows the following well-known pattern:

For K=1, Data stream #1 is assigned Walsh code $W_i$, wherein $0 \leq i \leq 63$.

For K=2, Parallel data stream #1 is assigned Walsh code $W_i$, where $0 \leq i \leq 31$; and Parallel data stream #2 is assigned Walsh code $W_{i+=}$.

For K=4, Parallel data stream #1 is assigned Walsh code $W_i$, where $0 \leq i \leq 15$;

Parallel data stream #2 is assigned Walsh code $W_{i+16}$;

Parallel data stream #3 is assigned Walsh code $W_{i+32}$; and

Parallel data stream #4 is assigned Walsh code $W_{i+48}$.

Those skilled in the art will understand how to extend this pattern for values of K up to 64. It will also be understood that one advantage of using such overlay Walsh encoding is more efficient use of circuitry at both the modulation stage in the transmitter as well as the demodulation stage in the receiver.

Wideband Modulation/Spreading Unit

Figure 6:
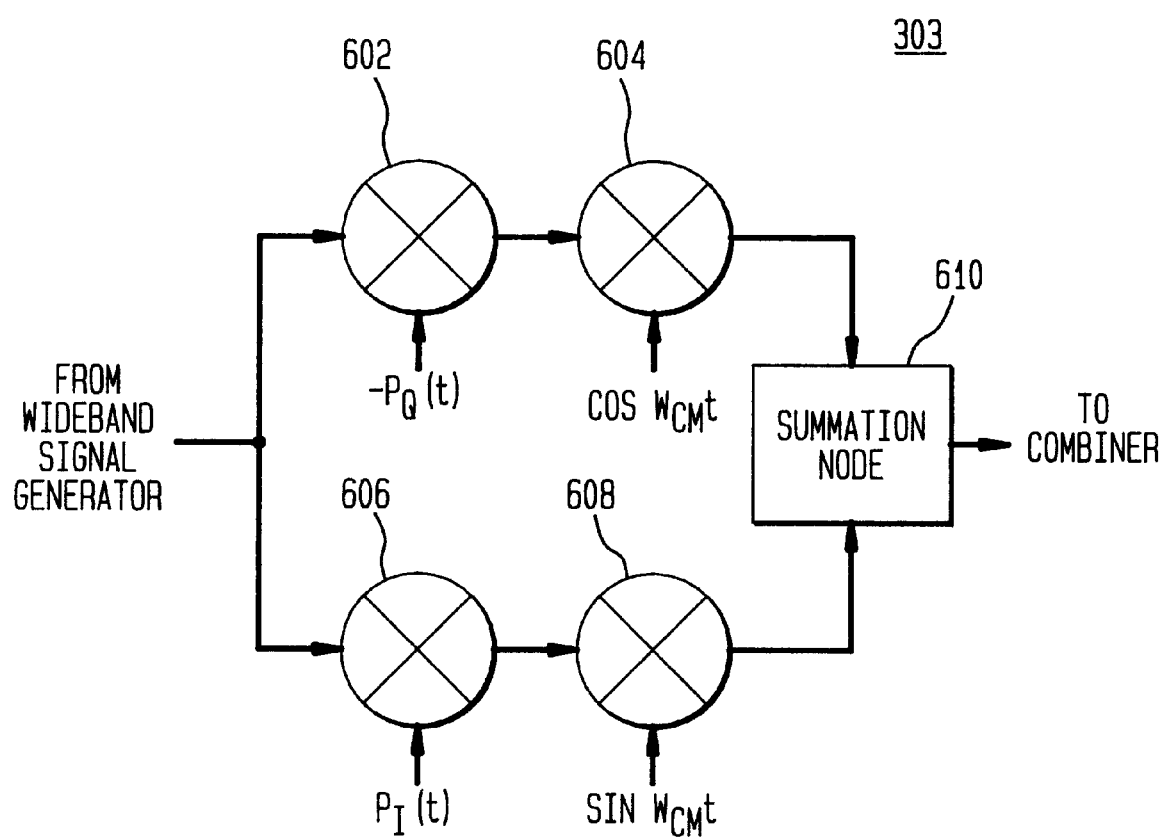
FIG. 6 is a block diagram of each wideband modulation/spreading unit of the network of FIG. 3.

Referring now to FIG. 6, there is shown a block diagram of each wideband modulation/spreading unit 303 of network 300 of FIG. 3. Each wideband unit 303 processes one of the M coded streams generated by wideband signal generator 302. According to this embodiment of the present invention, the coded streams generated by wideband signal generator 302 for each wideband data stream are modulated and spread over the same M carrier frequencies used by the M IS-95 signal generators 102. In order to ensure that the wideband signals do not interfere with the narrowband IS-95 signals the wideband signals are encoded using QPSK functions designed to ensure that the wideband signals for each data stream are orthogonal to both the wideband signals for all other wideband data streams as well as orthogonal to the narrowband signals for all IS-95 users. The QPSK spread-spectrum modulation scheme of each wideband unit 303 ensures this orthogonality.

In particular, the signals from wideband signal generator 302 are processed along two parallel paths. In the first path, multiplier 602 combines the signals from wideband signal generator 302 with the signal $-P_Q(t)$ and the resulting signals are then combined by multiplier 604 with the signals ($\cos w_{cm}t$), where $w_{cm}$ is the $m^{th}$ carrier frequency. In the second path, multiplier 606 combines the signals from wideband signal generator 302 with the signal $P_I(t)$ and the resulting signals are then combined by multiplier 608 with the signals ($\sin w_{cm}t$). As described earlier in conjunction with FIG. 2, $P_I(t)$ and $P_Q(t)$ are the in-phase and quadri-phase parts, respectively, of short PN codes used in QPSK modulation. The function $-P_Q(t)$ is the logical negation of $P_Q(t)$. As before, multipliers 604 and 608 modulate the signals by the carrier frequency $w_{cm}$. The signals from multipliers 604 and 608 are then combined at summation node 610 to generate the output signal from unit 303, which is transmitted to combiner 304 of FIG. 3.

Referring again to FIG. 2, the IS-95 modulation scheme implemented by multipliers 214–220 and summation node 222 can be considered to be a first version of a QPSK modulation scheme. In this first version, the cosine function of the carrier frequency ($\cos w_{cm}t$) is multiplied by the in-phase signal that is generated by combining the in-phase part of the QPSK modulation scheme ($P_I(t)$) with the signal from Walsh multiplier 212. In addition, the sine function of the carrier frequency ($\sin w_{cm}t$) is multiplied by the quadri-phase signal that is generated by combining the quadri-phase part of the QPSK modulation scheme ($P_Q(t)$) with the signal from Walsh multiplier 212.

The modulation scheme implemented by wideband unit 303 of FIG. 6 can be considered to be a second version of the QPSK modulation scheme implemented by the IS-95 components of FIG. 2. In this second version, the cosine function of the carrier frequency ($\cos W_{cm}t$) is multiplied by the quadri-phase signal that is generated by combining the logical negation of the quadri-phase part of the QPSK modulation scheme ($-P_Q(t)$) with the signal from wideband signal generator 302. In addition, the sine function of the carrier frequency ($\sin w_{cm}t$) is multiplied by the in-phase signal that is generated by combining the in-phase part of the QPSK modulation scheme ($P_I(t)$) with the signal from wideband signal generator 302.

For the implementation of FIG. 2, the following terminology can be applied:

The signal from Walsh multiplier 212 is a first data stream;

Multiplier 214 combines the first data stream with a first or in-phase part of a QPSK modulation scheme to generate a first-part signal for the first stream also called a first in-phase signal;

Multiplier 218 combines the first data stream with a second or quadri-phase part of the QPSK modulation scheme to generate a second-part signal for the first stream also called a first quadri-phase signal;

Multipliers 216 and 220 and summation node 222 modulate the first-part signal and the second-part signal for the first stream to generate a first modulated signal;

In particular, multiplier 216 multiplies the first in-phase signal by a cosine function of the carrier frequency to generate a first-stream cosine signal;

Multiplier 220 multiplies the first quadri-phase signal by a sine function of the carrier frequency to generate a first-stream sine signal;

Summation node 222 combines the first-stream cosine signal and the first-stream sine signal to generate the first modulated signal.

Similarly, for the implementation of FIG. 6, the following terminology can be applied:

The signal from wideband signal generator 302 is a second data stream;

Multiplier 602 combines the second data stream with the logical negation of the second or quadri-phase part of the QPSK modulation scheme to generate a second-part signal for the second stream also called a second quadri-phase signal;

Multiplier 606 combines the second data stream with the first or in-phase part of the QPSK modulation scheme to generate a first-part signal for the second stream also called a second in-phase signal;

Multipliers 604 and 608 and summation node 610 modulate the first-part signal and the second-part signal for the second stream to generate a second modulated signal;

In particular, multiplier 604 multiplies the second quadri-phase signal by the cosine function of the carrier frequency to venerate a second-stream cosine signal;

Multiplier 608 multiplies the second in-phase signal by the sine function of the carrier frequency to generate a second-stream sine signal;

Summation node 610 combines the second-stream cosine signal and the second-stream sine signal to generate the second modulated signal.

Using the second version of the QPSK modulation scheme for the wideband data streams ensures that the modulated signals generated by each wideband unit 303 are orthogonal to the IS-95 signals that are spread and modulated over the same carrier-frequency band by the corresponding IS-95 signal generator 102. Those skilled in the art will understand that wideband units 303 could implement other versions of the QPSK modulation scheme to achieve orthogonality. For example, multipliers 602 and 606 could multiply the signals from wideband signal generator 302 by $+P_Q(t)$ and $-P_I(t)$, respectively, to generate modulated signals that are orthogonal to the IS-95 signals. Those skilled in the art will understand that other combinations may involve changing the signs of the cosine and/or sine functions.

Figure 7:
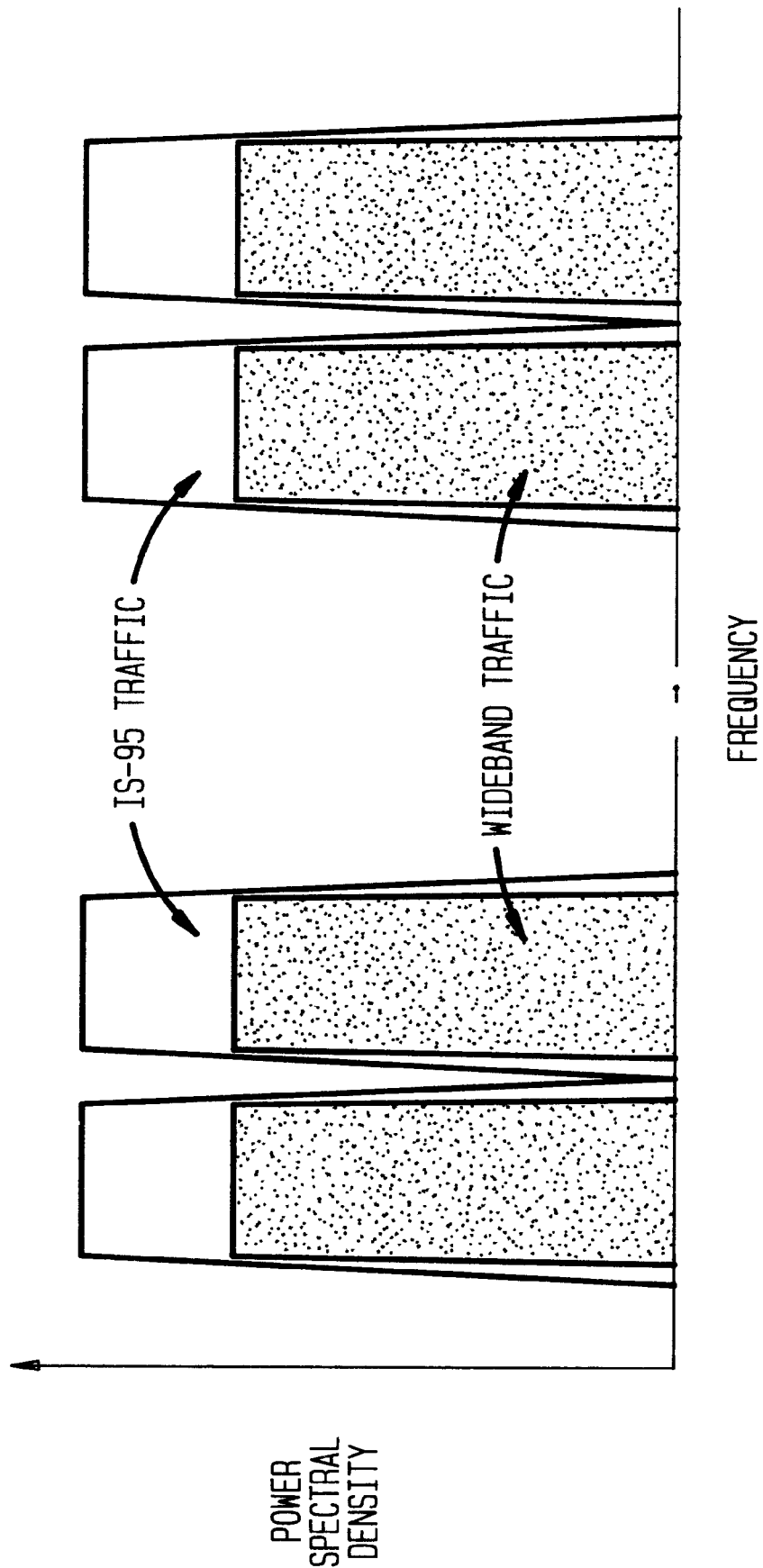
FIG. 7 shows a representation of a typical power spectrum for the forward link generated by the wideband network of FIG. 3.

As mentioned earlier, wideband signal generator 302 and wideband units 303 combine to modulate and spread the wideband data for each wideband data stream over all M carrier frequencies. The Minodulated signals generated by wideband units 303 for each wideband data stream can be considered to constitute a single multi-band signal. At the same time, each IS-95 signal generator 102 modulates and spreads the narrowband data for each narrowband user over its corresponding carrier frequency. FIG. 7 shows a representation of a typical power spectrum for the forward link generated by wideband network 300 of FIG. 3. The IS-95 traffic is spread over M carrier-frequency bands with up to 64 different narrowband users contained within each band. At the same time, the wideband traffic for up to M*64 different wideband data streams is spread over all M carrier frequency bands. Because the wideband traffic is spread over all of the bands, the total power spectral density may be lower than that for the narrowband traffic.

As shown in FIG. 3, wideband network 300 supports both conventional IS-95 narrowband traffic as well as the wideband traffic of the present invention. Wideband network 300 is therefore backwards compatible with conventional IS-95 technology. As such, the present invention may be implemented to work in conjunction with the existing IS-95 infrastructure, thereby avoiding the expense of replacing the existing hardware.

Those skilled in the art will understand that all of the modulated signals generated by wideband network 300 are assured of being mutually orthogonal in at least one of three different aspects: frequency, code, or phase. These modulated signals include the up to M*64 modulated signals generated by the M IS-95 signal generators 102 and the up to M*64 multi-band signals generated by the M wideband units 303. IS-95 modulated signals that are in different carrier-frequency bands are mutually orthogonal in the frequency domain. IS-95 modulated signals that are in the same carrier-frequency band are mutually orthogonal in the code domain, as a result of the conventional IS-95 Walsh-code-based CDMA access scheme. In addition, the multi-band signals generated for the wideband data streams are mutually orthogonal in the code domain as a result of the multi-band CDMA access scheme implemented by Walsh encoder 412 of FIG. 4. Mutual orthogonality in phase between each IS-95 modulated signal and each wideband modulated signal within the same carrier-frequency band is assured by the special QPSK functions selected for modulation by each wideband unit 303, even if an IS-95 modulated signal is encoded using the same Walsh code sequence as the wideband modulated signal. This mutual orthogonality between all modulated signals ensures that none of the modulated signals will adversely interfere with any of the other modulated signals within network 300.

Receiver Architecture

Figure 8:
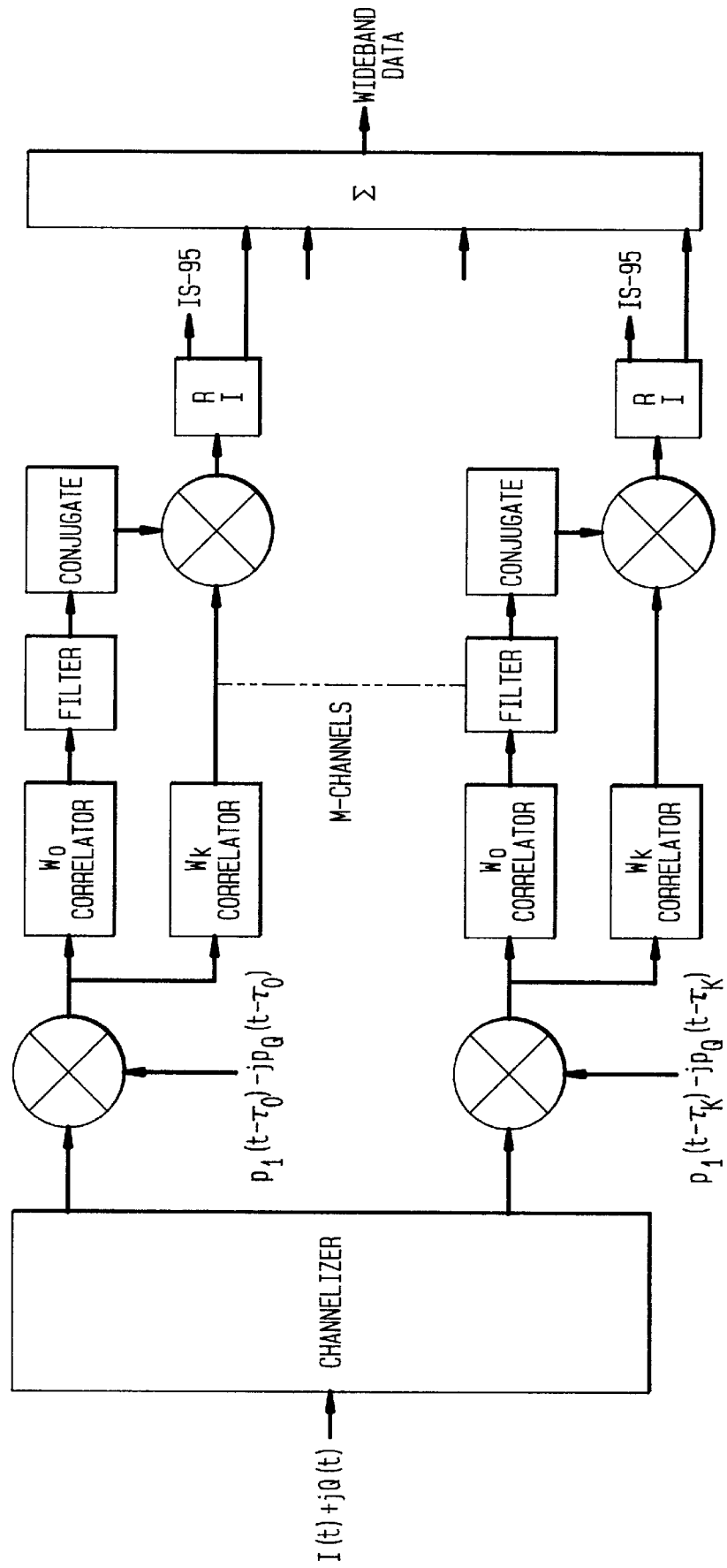
FIG. 8 shows a block diagram of a receiver designed to recover the data transmitted by the wideband network of FIG. 3.

Referring now to FIG. 8, there is shown a block diagram of receiver 800 designed to recover the data transmitted by wideband network 300 of FIG. 3, according to one embodiment of the present invention. Receiver 800 can be used to recover either conventional IS-95 narrowband signals or wideband signals of the present invention or both at the same time. Those skilled in the art will understand that receiver 800 is just one possible implementation of a receiver for recovering the IS-95 and wideband data transmitted by wideband network 300.

Not shown in FIG. 8 are the antenna and converters that receive and process the radio frequency (RF) signals transmitted by antenna 308 of FIG. 3. The RF signals are down converted in quadrature and sample at an appropriate rate to generate digital streams corresponding to the in-phase part I(t) and the quadri-phase part Q(t) of the incoming signals. The channelizer of FIG. 8 channelizes the in-phase and quadri-phase part into M channels, one channel corresponding to each of the M carrier-frequency bands of wideband network 300. Each of the M channels is processed along an analogous parallel path described as follows.

The first multiplier in each path performs the despreading function of a rake receiver. The $W_0$ correlator extracts the unmodulated IS-95 pilot channel, which is used as a channel gain and phase reference for both IS-95 and wideband signals. The $W_k$ correlator extracts the data channels. The pilot channel is filtered and conjugated and then multiplied with the data channels to remove the phase variations imposed by the channel. This processed data is then split into real and imaginary components. The real-component stream corresponds to the IS-95 data in the received RF signals. This IS-95 data is then recovered (i.e., deinterleaved and decoded) using conventional IS-95 recovery processing. The imaginary-component stream corresponds to the wideband data for that particular channel in the received RF signals.

The wideband data for all M channels are summed together to generate the total wideband data stream, which is deinterleaved and decoded using wideband processing that is analogous to that performed during IS-95 recovery processing.

Those skilled in the art will understand that wideband network 300 of FIG. 3 supports communications having data rates substantially higher than those supported by conventional IS-95 network 100 of FIG. 1. Moreover, the present invention effectively doubles the number of data streams that can be supported without increasing the number of carrier frequencies (M) or the number of Walsh codes (64).

The discussion of the present invention has focussed on the forward link in the communications network, that is, from the base station to the mobile units (e.g., cellular telephones). Those skilled in the art will understand that the reverse link (i.e., from the mobile units to the base station) may be either a narrowband signal conforming to the IS-95 standard or a wideband signal similar to that described for the forward link. In many applications, the reverse link need only be a conventional IS-95 narrowband signal, while the forward link is preferably a wideband signal of the present invention. For example, in one implementation, mobile units located in automobiles may request maps and other direction information from the nearest base station. The data requests in the reverse link may require only relatively low bandwidth, while the data transfers in the forward link may require high bandwidth. In such a system, the forward link can be based on the wideband signals of the present invention while the reverse link uses conventional IS-95 signals.

Those skilled in the art will understand that the present invention may be implemented in different ways. For example, the processing can be implemented entirely in hardware. Alternatively, much of the digital processing can be implemented in software. As such, it will be understood that processing can be implemented either in analog or digital or with some of the processing in each. It will also be understood that the present invention can be implemented in contexts other than that of the IS-95 technology. For example, code sequences other than Walsh codes could be used, as long as they ensure orthogonality between the resulting modulated signals.

In the embodiment described in conjunction with FIG. 6, the present invention is implemented using QPSK modulation. Those skilled in the art will understand that alternative embodiments may be based on other types of modulation including but not limited to bi-phase shift keying (BPSK) modulation.

In the embodiment described in conjunction with FIG. 4, the present invention is implemented using CDMA methodology. Those skilled in the art will understand that alternative embodiments may be based on other access methodologies, including but not limited to frequency division multiple access (FDMA) methodology or time division multiple access (TDMA) methodology. Still other embodiments may be based on a single access methodology.

In the embodiment described in conjunction with FIG. 6, the spread spectrum modulation scheme is implemented in multiple different carrier-frequency bands to ensure orthogonality between IS-95 signals and wideband signals within each frequency bands. Those skilled in the art will understand that such a modulation scheme can also be implemented in systems that rely on a single carrier-frequency band.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for generating communications signals, comprising the steps of:
   (a) generating a plurality of modulated signals for each data stream of a plurality of data streams, wherein each data stream corresponds to a single source of data, each modulated signal, for each data stream, is generated at a different carrier frequency, and each modulated signal comprises all of the information in the corresponding data stream; and
   (b) combining the modulated signals for transmission as a multi-band signal.

2. The invention of claim 1, wherein step (a) comprises the steps of:
   (1) combining each data stream with one or more code sequences to generate a plurality of coded streams, wherein each coded stream corresponds to the data stream combined with one of the code sequences and each coded stream comprises all of the information in the data stream; and
   (2) modulating each of the coded streams for each data stream at a different carrier frequency to generate the plurality of modulated signals.

3. The invention of claim 2, wherein the code sequences are Walsh code sequences.

4. The invention of claim 2, wherein the one or more code sequences comprise a particular code sequence and a logical negation of the particular code sequence.

5. The invention of claim 2, wherein:
   the one or more code sequences are a first set of one or more code sequences;
   the plurality of coded streams is a first plurality of coded streams;
   the plurality of modulated signals is a first plurality of modulated signals;
   step (a) further comprises the steps of:
   (3) combining a second data stream with a second set of one or more code sequences, orthogonal to the first set of code sequences, to generate a second plurality of coded streams, wherein each of the second plurality of coded streams corresponds to the second data stream combined with one of the code sequences of the second set of code sequences and each of the second plurality of coded streams comprises all information in the second data stream; and
   (4) modulating each of the second plurality of coded streams at a different carrier frequency to generate a second plurality of modulated signals, wherein each of the second plurality of coded streams is modulated at the same carrier frequency as one of the first plurality of coded streams; and
   step (b) comprises the step of combining the first and second pluralities of modulated signals for transmission as two multi-band signals.

6. The invention of claim 5, wherein each multi-band signal is orthogonal to each other multi-band signal.

7. The invention of claim 5, wherein the first set of code sequences is based on a first Walsh code sequence and the second set of code sequences is based on a second Walsh code sequence orthogonal to the first Walsh code sequence.

8. The invention of claim 5, wherein the first set of code sequences and the second set of code sequences are both based on a first Walsh code sequence, wherein at least one set of code sequences comprises a logical negation of the first Walsh code sequence.

9. The invention of claim 2, wherein step (b) comprises the step of combining the modulated signals with one or more IS-95 signals corresponding to one or more of the carrier frequencies.

10. The invention of claim 1, wherein step (a) comprises the step of generating each modulated signal using quadrature-phase shilft-keying (QPSK) modulation.

11. The invention of claim 10, wherein, for each carrier frequency, step (a) comprises the steps of:
    (1) combining an input stream corresponding to the data stream with an in-phase code function to generate an in-phase coded stream;
    (2) combining the input stream with a quadri-phase code function to generate a quadri-phase coded stream; and
    (3) modulating the in-phase and quadri-phase coded streams at the carrier frequency.

12. The invention of claim 1, wherein step (b) comprises the step of combining the modulated signals with one or more IS-95 signals corresponding to one or more of the carrier frequencies.

13. The invention of claim 12, wherein each of the modulated signals is orthogonal to every IS-95 signal.

14. An apparatus for generating communications signals, comprising:
    (a) means for generating a plurality of modulated signals for each data stream of a plurality of data streams, wherein each data stream corresponds to a single source of data, each modulated signal, for each data stream, is generated at a different carrier frequency, and each modulated signal comprises all of the information in the corresponding data stream; and
    (b) means for combining the modulated signals for transmission as a multi-band signal.

15. An apparatus for generating communications signals, comprising a plurality of modulators adapted to generate a plurality of modulated signals for each data stream of a plurality of data streams, wherein each data stream corresponds to a single source of data, each modulator is adapted to generate, for each data stream, a modulated signal of the plurality of modulated signals at a different carrier frequency and each modulated signal comprises all of the information in the corresponding data stream, wherein a combiner is adapted to combine the modulated signals for transmission as a multi-band signal.

16. The invention of claim 15, further comprising an encoder, wherein:
    the encoder is adapted to combine each data stream with one or more code sequences to generate a plurality of coded streams, wherein each coded stream corresponds to the data stream combined with one of the code sequences and each coded stream comprises all of the information in the data stream; and
    each modulator is adapted to modulate each of the coded streams for each data stream at a different carrier frequency to generate the plurality of modulated signals.

17. The invention of claim 16, wherein the code sequences are Walsh code sequences.

18. The invention of claim 16, wherein the one or more code sequences comprise a particular code sequence and a logical negation of the particular code sequence.

19. The invention of claim 16, wherein:
    the one or more code sequences are a first set of one or more code sequences;

the plurality of coded streams is a first plurality of coded streams:

the plurality of modulated signals is a first plurality of modulated signals;

the encoder is further adapted to combine a second data stream with a second set of one or more code sequences, orthogonal to the first set of code sequences, to generate a second plurality of coded streams, wherein each of the second plurality of coded streams corresponds to the second data stream combined with one of the code sequences of the second set of code sequences and each of the second plurality of coded streams comprises all information in the second data stream; and each modulator is further adapted to modulate each of the second plurality of coded streams at a different carrier frequency to generate a second plurality of modulated signals, wherein each of the second plurality of coded streams is modulated at the same carrier frequency as one of the first plurality of coded streams; and the combiner is adapted to combine the first and second pluralities of modulated signals for transmission as two multi-band signals.

20. The invention of claim 19, wherein each multi-band signal is orthogonal to each other multi-band signal.

21. The invention of claim 19, wherein the first set of code sequences is based on a first Walsh code sequence and the second set of code sequences is based on a second Walsh code sequence orthogonal to the first Walsh code sequence.

22. The invention of claim 19, wherein the first set of code sequences and the second set of code sequences are both based on a first Walsh code sequence, wherein at least one set of code sequences comprises a logical negation of the first Walsh code sequence.

23. The invention of claim 16, wherein the encoder and the plurality of modulators are adapted to operate in conjunction with an IS-95 network.

24. The invention of claim 23, wherein:

the IS-95 network comprises M IS-95 signal generators, each of which is adapted to generate one or more IS-95 signals at a different one of M carrier frequencies;

the encoder is adapted to generate M coded streams for each data stream;

the plurality of modulators comprises M modulators;

each modulator is adapted to modulate one of the M coded streams at one of the M carrier frequencies to generate one of M modulated signals for each data stream; and the combiner is adapted to combine the IS-95 signals and the modulated signals for transmission.

25. The invention of claim 24, wherein:

the code sequences are Walsh code sequences and logical negations of the Walsh code sequences;

to generate each of the M coded streams, the encoder is adapted to apply either a particular Walsh code sequence or the logical negation of the particular Walsh code sequence to the data stream;

each modulator is adapted to:
  (1) combine a particular coded stream with an in-phase code function to generate an in-phase coded stream;
  (2) combine the particular coded stream with a quadri-phase code function to generate a quadri-phase coded stream; and
  (3) modulate the in-phase and quadri-phase coded streams at a particular carrier frequency;

each Walsh code sequence is orthogonal to every other Walsh code sequence; and each modulated signal is orthogonal to every other modulated signal and orthogonal to all of the IS-95 signals.

26. The invention of claim 25, wherein, for each modulator, the in-phase and quadri-phase code functions are selected to be orthogonal to in-phase and quadri-phase code functions used to generate the IS-95 signals.

27. The invention of claim 15, wherein each modulator is adapted to generate each modulated signal using QPSK modulation.

28. The invention of claim 27, wherein each modulator is adapted to:

(1) combine an input stream corresponding to the data stream with an in-phase code function to generate an in-phase coded stream;
  (2) combine the input stream with a quadri-phase code function to generate a quadri-phase coded stream; and
  (3) modulate the in-phase and quadri-phase coded streams at a particular carrier frequency.

29. The invention of claim 15, wherein the combiner is adapted to combine the modulated signals with one or more IS-95 signals corresponding to one or more of the carrier frequencies.

30. The invention of claim 29, wherein each of the modulated signals is orthogonal to every IS-95 signal.

* * * * *